UNITED STATES PATENT OFFICE.

CLAYTON BEADLE, OF LONDON, ENGLAND, ASSIGNOR TO THE AMERICAN VISCOSE COMPANY, OF BOSTON, MASSACHUSETTS.

ADHESIVE COMPOUND.

SPECIFICATION forming part of Letters Patent No. 569,704, dated October 20, 1896.

Application filed June 8, 1894. Serial No. 513,905. (No specimens.)

*To all whom it may concern:*

Be it known that I, CLAYTON BEADLE, of London, county of Middlesex, England, have invented an Improvement in Adhesive Compounds, of which the following description is a specification.

This invention has for its object to produce a new and useful adhesive compound adapted for bookbinding, cabinet-making, and many other purposes.

The adhesive compound consists, essentially, of a plastic compound of cellulose, with the addition thereto of certain substances which augment and improve its adhesive properties—such, for instance, as an insoluble soap, which may be made in various ways and of different ingredients, such, for instance, as resinate of alumina or resinate of zinc—the compound thus produced being allowed to slowly decompose after application, resulting in the formation of insoluble amorphous or non-fibrous cellulose, with certain by-products, which are or may be retained, as their presence is by no means objectionable for many purposes.

The decomposed adhesive compound or insoluble amorphous cellulose is not acted upon by moisture or by contact with water, as is the ordinary glue, and, furthermore, it has great flexibility.

In making the adhesive compound I prefer to use a mixture which is prepared as follows: Take a solution made by dissolving one part of the plastic compound of cellulose, made, for example, by treating cellulose with a caustic alkali and carbon bisulphid, as set forth in Letters Patent No. 520,770, in four parts of water, and add to the same, say, two parts of an insoluble soap, preferably consisting, essentially, of resinate of alumina. This insoluble soap may be made in the following way, viz: Resin, preferably pulverized, is dissolved by boiling it with a strong alkali, such as a solution of carbonate of soda. The same is filtered, and after cooling the mass, which consists of a resin soap, it is dissolved in water, which may be done at 90° Fahrenheit or thereabout, to form a milky solution. To this is added a solution containing, say, twenty per cent. of sulfate of alumina, just sufficient to precipitate the resin as resinate of alumina. This is passed through a cloth or filtering medium, whereby the resinate of alumina is retained and the soluble by-products pass through. The mixture, after draining, contains from twenty to twenty-five per cent. of flocculent resinate of alumina, and this is mixed with the solution of the cellulose compound in the proportions as above stated.

The adhesive compound thus produced is applied or used in substantially the same manner as glue.

The solution should always be used cold, but after the application to any surface the same may be heated or placed in a warm place to accelerate the drying and decomposition.

The resinate of alumina combines with the free alkali contained in the original solution to form resinate of soda and aluminate of soda, which results in the production of a very viscous and tacky solution. This when applied to any surface remains tacky for a sufficient length of time to enable the operator to coat several pieces and to apply them one by one to any surface or to remove a piece after it has been applied to alter its position on the surface without interfering with its power of sticking. This property is of great value in bookbinding and other work.

If it is desired to give a thick coating, three or four applications may be made, leaving a few minutes in between each to allow the solution to become absorbed.

The addition of the insoluble soap, as the resinate, for instance, also has the effect of giving the adhesive compound additional flexibility.

As the adhesive compound decomposes its character is changed, as, for instance, the soluble cellulose compound becomes an insoluble compound of an amorphous nature.

When it is necessary to have a perfectly-colorless solution, such as when two pieces of white paper are to be adhered together or when the end sheets of the book are to be adhered to the side boards, I use a decolorized solution, which may be made by dissolving one part of the aforesaid plastic compound of cellulose in five parts of water and adding thereto one part of a five-per-cent. solution of sulfurous acid or its equivalent.

This solution for some purposes may be diluted with twice its volume of water, but for other purposes where high sticking qualities are required it should be used at its full strength.

In place of sulfurous acid sodium bisulfite or certain weak or organic acids, such as acetic acid, may be used. For some purposes a mixture of this decolorized solution with the mixture first referred to may be used with advantage.

In order to obtain a stronger decolorized solution, I may take the plastic compound of cellulose prepared as set forth in the application referred to, in a flaky condition, as when first made, and mix it with a solution of sodium bisulfite or its equivalent. I dissolve one part of the sodium bisulfite in twenty parts of water and mix two parts of the plastic-cellulose compound with five parts of the bisulfite solution. This on agitation for thirty minutes or thereabout dissolves, producing a strong decolorized solution which keeps longer than the decolorized solution made by the first-described method.

For other adhesive purposes where a purer solution is required, such as for sticking together sheets of pastings for the production of a fine quality cardboard and the like, I proceed as follows: To ten parts of the freshly-made flaky plastic cellulose compound is added, say, eight parts of a solution containing thirty per cent. of sodium bisulfite, by which the plastic mass is decolorized without entering into the solution. The mass is submitted to pressure, by which the greater part of the by-products are removed. The resulting flaky material is dissolved by agitation with water. If a smaller amount of bisulfite is added, it will be found more difficult to remove the by-products by pressure, but the compound after pressing will be more regularly dissolved and the solution obtained therefrom less liable to chemical change.

The mixtures made by one or other of the above methods should be kept cool, as they last longer and retain their tacky qualities at a low temperature.

Substances may be added to these solutions to render them more pliant, such as glycerin, dextrin, or glucose. When any one of these mixtures is used for adhesive purposes, it is caused to adhere by the solution setting or gelatinizing, after which the same decomposes with the formation of insoluble amorphous cellulose. The by-products obtained by this decomposition are retained in the medium chiefly as sulfate of soda.

In the mixtures where resinate of alumina is used the resin combines with the free soda and likewise with the alumina to form sodium resinate and aluminate, both of which are retained by the insoluble amorphous cellulose, the former adding to its pliability and flexibility and the latter giving it body.

The presence of sulfate of soda is by no means an objection for many purposes.

When the insoluble soap is omitted, the soluble cellulose compound will be used, with the result that decomposition takes place after application, and an insoluble amorphous or non-fibrous cellulose is produced.

I claim—

1. The adhesive compound herein described consisting essentially of a mixture of a soluble compound of cellulose, and an insoluble soap.

2. The adhesive compound herein described consisting essentially of a mixture of a soluble compound of cellulose, consisting of cellulose treated with a caustic alkali and carbon bisulfid, and an insoluble soap.

3. The adhesive compound herein described consisting essentially of a mixture of a soluble compound of cellulose and resinate of alumina, or its equivalent.

4. The decolorized adhesive compound herein described consisting essentially of a mixture of a soluble compound of cellulose, and a decolorizing agent, and an insoluble soap.

In testimony whereof I have signed my name to this specification in the presence of two subscribing witnesses.

CLAYTON BEADLE.

Witnesses:
B. J. NOYES,
FLORENCE H. DAVIS.